(12) United States Patent
Zhang et al.

(10) Patent No.: US 10,303,185 B2
(45) Date of Patent: *May 28, 2019

(54) MULTI-CAMERA SYSTEM AND METHOD OF USE

(71) Applicant: Hangzhou Zero Zero Technology Co., Ltd., Chaoyang District, Beijing (CN)

(72) Inventors: Tong Zhang, Beijing (CN); Wei Li, Beijing (CN); Xiang Li, Beijing (CN); Jia Lu, Beijing (CN)

(73) Assignee: Hangzhou Zero Zero Technology Co., Ltd., Hangzhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/052,494

(22) Filed: Aug. 1, 2018

(65) Prior Publication Data

US 2018/0341278 A1 Nov. 29, 2018

Related U.S. Application Data

(63) Continuation of application No. 15/875,967, filed on Jan. 19, 2018, now Pat. No. 10,067,513.

(Continued)

(51) Int. Cl.
| | |
|---|---|
| *G05D 1/10* | (2006.01) |
| *G06T 7/73* | (2017.01) |
| *H04N 5/247* | (2006.01) |
| *H04N 7/18* | (2006.01) |
| *H04N 5/225* | (2006.01) |

(Continued)

(52) U.S. Cl.
CPC ............ *G05D 1/102* (2013.01); *G06T 7/593* (2017.01); *G06T 7/74* (2017.01); *H04N 5/2252* (2013.01); *H04N 5/2256* (2013.01); *H04N 5/2258* (2013.01); *H04N 5/2354* (2013.01); *H04N 5/23203* (2013.01); *H04N 5/23229* (2013.01); *H04N 5/247* (2013.01); *H04N 5/332* (2013.01); *H04N 7/181* (2013.01); *H04N 7/185* (2013.01); *H04N 13/243* (2018.05); *B64C 39/024* (2013.01); *B64C 2201/141* (2013.01); *B64C 2201/146* (2013.01); *G06T 2207/10012* (2013.01); *G06T 2207/10024* (2013.01);

(Continued)

(58) Field of Classification Search
CPC . G05D 1/102; G06T 7/74; G06T 2207/30261; G06T 2207/30241; H04N 5/247; H04N 7/181; B64C 2201/146; B64C 2201/141; B64C 39/024
USPC ........................................................ 382/104
See application file for complete search history.

(56) References Cited

U.S. PATENT DOCUMENTS

| | | |
|---|---|---|
| 3,083,935 A | 4/1963 | Piasecki |
| 5,351,913 A | 10/1994 | Cycon et al. |

(Continued)

FOREIGN PATENT DOCUMENTS

| | | |
|---|---|---|
| CN | 102511162 A | 6/2012 |
| CN | 104197928 A | 12/2014 |

(Continued)

*Primary Examiner* — Amandeep Saini
(74) *Attorney, Agent, or Firm* — Jeffrey Schox; Diana Lin

(57) ABSTRACT

A method for operating a system including a plurality of cameras, the method including: selecting a subset of the cameras, determining a subset of pixels captured by the camera subset, determining a pixel depth associated with each pixel of the pixel subset, and controlling system operation based on the pixel depth.

21 Claims, 9 Drawing Sheets

Related U.S. Application Data

(60) Provisional application No. 62/449,340, filed on Jan. 23, 2017.

(51) Int. Cl.
*H04N 5/232* (2006.01)
*H04N 5/235* (2006.01)
*H04N 5/33* (2006.01)
*G06T 7/593* (2017.01)
*H04N 13/243* (2018.01)
*B64C 39/02* (2006.01)

(52) U.S. Cl.
CPC ............ *G06T 2207/10032* (2013.01); *G06T 2207/30241* (2013.01); *G06T 2207/30261* (2013.01)

(56) References Cited

U.S. PATENT DOCUMENTS

| | | |
|---|---|---|
| 5,419,514 A | 5/1995 | Duncan |
| 5,503,351 A | 4/1996 | Vass |
| 5,890,441 A | 4/1999 | Swinson et al. |
| 6,260,796 B1 | 7/2001 | Klingensmith |
| 6,270,038 B1 | 8/2001 | Cycon et al. |
| 6,293,491 B1 | 9/2001 | Wobben |
| 6,547,180 B1 | 4/2003 | Cassidy |
| 6,745,977 B1 | 6/2004 | Long et al. |
| 6,773,321 B1 | 8/2004 | Urquiaga |
| 7,011,274 B1 | 3/2006 | Hardoin |
| 7,429,997 B2 | 9/2008 | Givon |
| 7,712,701 B1 | 5/2010 | Ehrmantraut et al. |
| 8,564,148 B1 | 10/2013 | Novak |
| 8,590,829 B2 | 11/2013 | Keidar et al. |
| 9,004,396 B1 | 4/2015 | Colin et al. |
| D741,751 S | 10/2015 | Klaptocz et al. |
| D751,025 S | 3/2016 | Howell et al. |
| 9,277,130 B2 | 3/2016 | Wang et al. |
| 9,321,531 B1 | 4/2016 | Takayama et al. |
| 9,346,543 B2 | 5/2016 | Kugelmass |
| 9,493,235 B2 | 11/2016 | Zhou et al. |
| 9,527,597 B1 | 12/2016 | Sada et al. |
| 9,550,567 B1 | 1/2017 | Erdozain et al. |
| 9,567,076 B2 | 2/2017 | Zhang |
| 9,815,552 B1 | 11/2017 | Welsh |
| 9,828,094 B2 | 11/2017 | McMillion |
| 9,889,930 B2 | 2/2018 | Welsh et al. |
| 9,902,493 B2 | 2/2018 | Simon et al. |
| 9,908,632 B1 | 3/2018 | Kimchi et al. |
| 9,914,538 B2 | 3/2018 | Yu |
| 2002/0142699 A1 | 10/2002 | Davis |
| 2003/0192989 A1 | 10/2003 | Owen et al. |
| 2003/0212478 A1 | 11/2003 | Rios |
| 2007/0262195 A1 | 11/2007 | Bulaga et al. |
| 2008/0054121 A1 | 3/2008 | Yoeli |
| 2010/0096493 A1 | 4/2010 | Khakimov et al. |
| 2010/0140416 A1 | 6/2010 | Ohanian et al. |
| 2011/0221692 A1 | 9/2011 | Seydoux et al. |
| 2012/0158215 A1 | 6/2012 | Sun et al. |
| 2012/0248259 A1 | 10/2012 | Page et al. |
| 2012/0267472 A1 | 10/2012 | Pratzovnick et al. |
| 2014/0032034 A1 | 1/2014 | Raptopoulos et al. |
| 2014/0037278 A1 | 2/2014 | Wang |
| 2014/0061362 A1 | 3/2014 | Olm et al. |
| 2014/0061376 A1 | 3/2014 | Fisher et al. |
| 2014/0099853 A1 | 4/2014 | Condon et al. |
| 2014/0158816 A1 | 6/2014 | Delorean |
| 2014/0259628 A1 | 9/2014 | Hethcock et al. |
| 2014/0374532 A1 | 12/2014 | Duffy et al. |
| 2014/0376170 A1 | 12/2014 | Richard et al. |
| 2015/0167492 A1 | 6/2015 | Collette et al. |
| 2015/0205301 A1 | 7/2015 | Gilmore et al. |
| 2015/0266570 A1 | 9/2015 | Metreveli |
| 2015/0274294 A1 | 10/2015 | Dahlstrom |
| 2016/0023755 A1 | 1/2016 | Elshafei et al. |
| 2016/0070265 A1 | 3/2016 | Liu et al. |
| 2016/0101856 A1 | 4/2016 | Kohstall |
| 2016/0122015 A1 | 5/2016 | Hutson |
| 2016/0122038 A1 | 5/2016 | Fleischman et al. |
| 2016/0144954 A1 | 5/2016 | Daigle |
| 2016/0152327 A1 | 6/2016 | Bertels |
| 2016/0176520 A1 | 6/2016 | Goldstein |
| 2016/0200415 A1 | 7/2016 | Cooper |
| 2016/0207368 A1 | 7/2016 | Gaonjur |
| 2016/0221683 A1 | 8/2016 | Roberts et al. |
| 2016/0229530 A1 | 8/2016 | Welsh et al. |
| 2016/0229533 A1* | 8/2016 | van Cruyningen ... B64C 31/024 |
| 2016/0229534 A1 | 8/2016 | Hutson |
| 2016/0280369 A1 | 9/2016 | Pounds |
| 2016/0286128 A1 | 9/2016 | Zhou |
| 2016/0340035 A1 | 11/2016 | Duru |
| 2016/0378108 A1 | 12/2016 | Paczan et al. |
| 2017/0011333 A1 | 1/2017 | Greiner et al. |
| 2017/0057630 A1 | 3/2017 | Schwaiger |
| 2017/0057650 A1 | 3/2017 | Walter-Robinson |
| 2017/0073070 A1 | 3/2017 | King |
| 2017/0144757 A1 | 5/2017 | Hall et al. |
| 2017/0152060 A1 | 6/2017 | Morisawa |
| 2017/0217585 A1 | 8/2017 | Hulsman et al. |
| 2017/0225783 A1 | 8/2017 | Fisher et al. |
| 2017/0291697 A1 | 10/2017 | Kornatowski et al. |
| 2017/0297707 A1 | 10/2017 | Rollefstad et al. |
| 2017/0313418 A1 | 11/2017 | Yoon |
| 2017/0322563 A1 | 11/2017 | Kohstall |
| 2018/0099745 A1 | 4/2018 | Welsh et al. |
| 2018/0141672 A1 | 5/2018 | Bevirt et al. |
| 2018/0155018 A1 | 6/2018 | Kovac et al. |
| 2018/0194463 A1 | 7/2018 | Hasinski et al. |

FOREIGN PATENT DOCUMENTS

| | | | |
|---|---|---|---|
| CN | 104684805 A | 6/2015 | |
| CN | 104743104 A | 7/2015 | |
| CN | 204507263 U | 7/2015 | |
| CN | 105035318 A | 11/2015 | |
| CN | 105173072 A | 12/2015 | |
| CN | 204822682 U | 12/2015 | |
| CN | 105352505 A | 2/2016 | |
| CN | 105836120 A | 8/2016 | |
| CN | 106022274 A | 10/2016 | |
| CN | 106204443 A | 12/2016 | |
| CN | 106335635 A | 1/2017 | |
| TW | 201226234 A | 7/2012 | |
| WO | 2013066475 A3 | 6/2013 | |
| WO | 2014003698 A1 | 1/2014 | |
| WO | WO-2014003698 A1 * | 1/2014 | ....... G06F 17/30041 |
| WO | 2016065623 A1 | 5/2016 | |
| WO | 2016101227 A1 | 6/2016 | |
| WO | 2016106715 A1 | 7/2016 | |
| WO | 2016107528 A1 | 7/2016 | |
| WO | 2016112124 A2 | 7/2016 | |

* cited by examiner

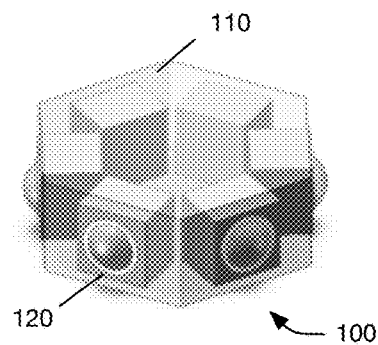
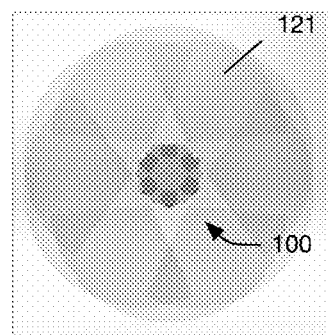
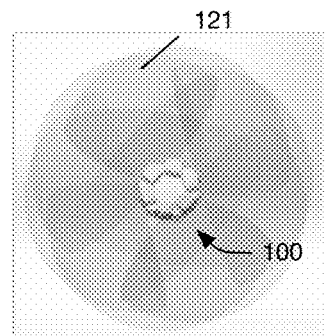
FIGURE 2A  FIGURE 2B  FIGURE 2C
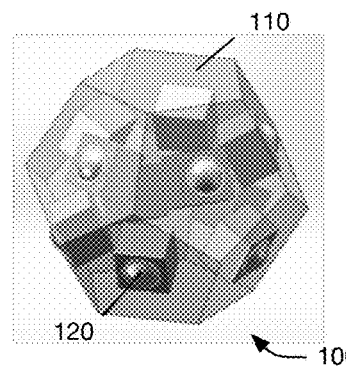
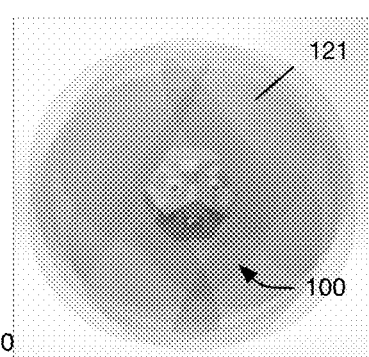
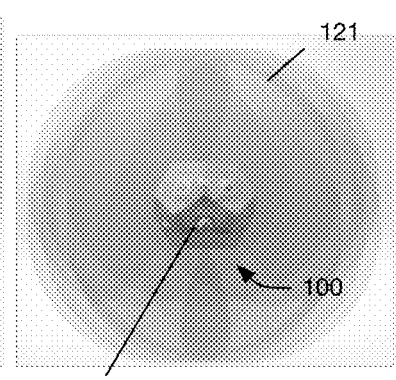
FIGURE 3A  FIGURE 3B  FIGURE 4
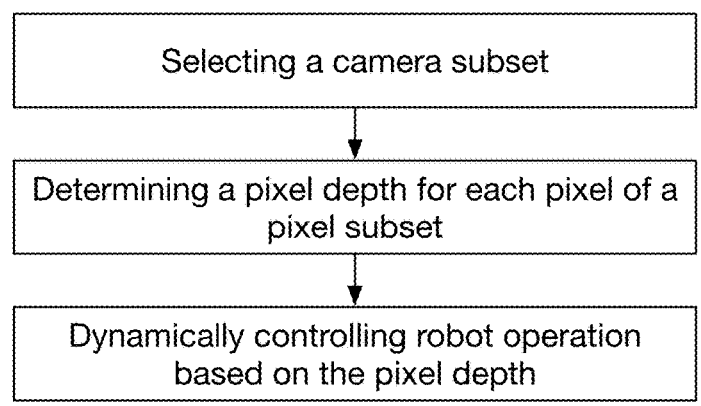
FIGURE 5

MULTI-CAMERA SYSTEM AND METHOD OF USE

CROSS-REFERENCE TO RELATED APPLICATIONS

This application is a continuation of U.S. application Ser. No. 15/875,967, filed 19 Jan. 2018, which claims the benefit of U.S. Provisional Application No. 62/449,340, filed 23 Jan. 2017, each of which is incorporated in its entirety by this reference.

TECHNICAL FIELD

This invention relates generally to the vision-based navigation field, and more specifically to a new and useful multi-camera system in the vision-based navigation field.

BRIEF DESCRIPTION OF THE FIGURES

FIGS. 2A, 2B, and 2C are an isometric view of an example of the system, a schematic representation of a projection of the respective view regions onto a common plane, and an isometric representation of the respective view regions, respectively.

FIGS. 3A and 3B are an isometric view of a second example of the system and an isometric representation of the respective view regions, respectively.

FIG. 4 is an isometric representation of the view regions of the second example of the system.

FIG. 5 is a flowchart representation of the method.

DESCRIPTION OF THE PREFERRED EMBODIMENTS

Figure 1:
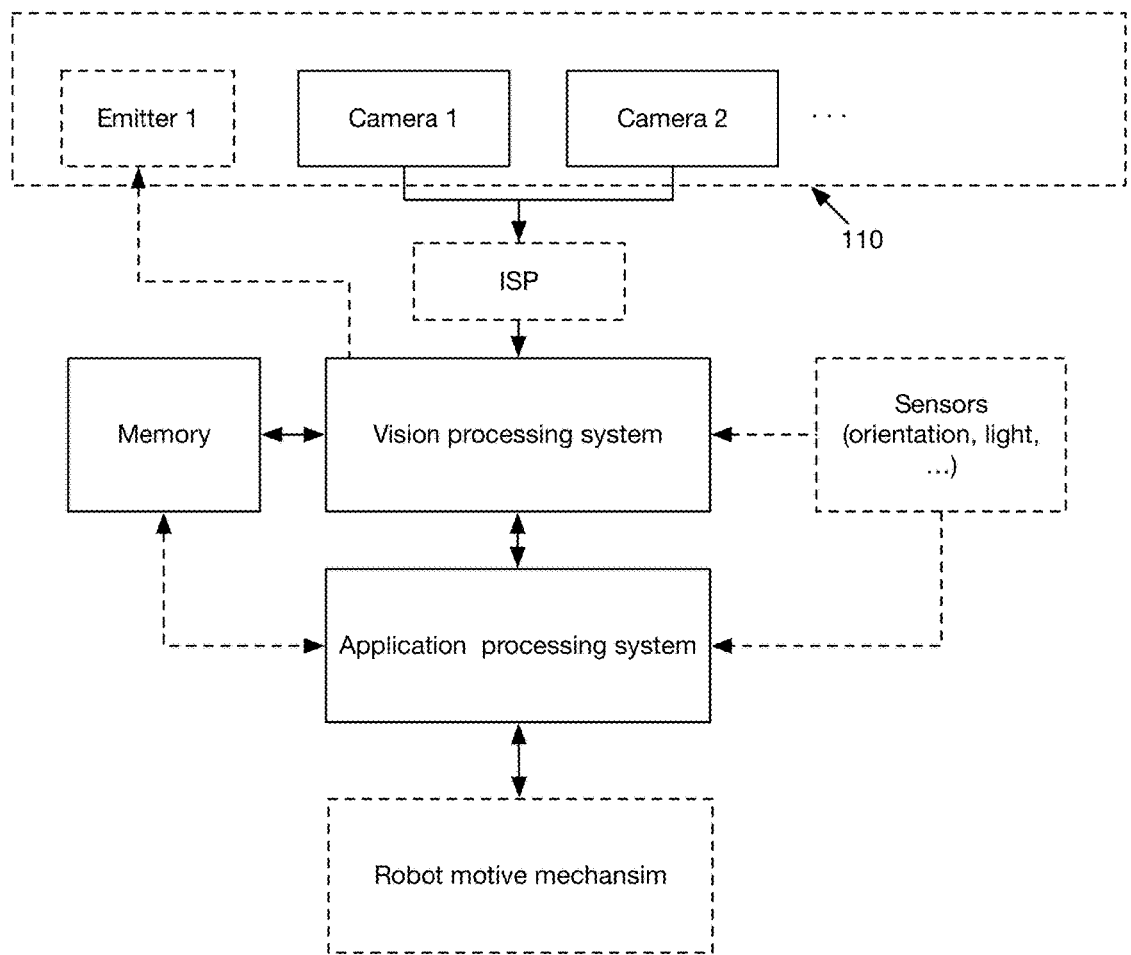
FIG. 1 is a schematic representation of the system.

The following description of the preferred embodiments of the invention is not intended to limit the invention to these preferred embodiments, but rather to enable any person skilled in the art to make and use this invention.

1. Overview.

As shown in FIG. 5, the method of using a multi-camera system includes: automatically selecting a camera subset from a plurality of cameras; determining a pixel depth for each pixel of a pixel subset, the pixel subset captured by the camera subset; and dynamically controlling robot operation based on the determined pixel depth.

The method functions to dynamically select different cameras for real- or near-real time image-based rangefinding, odometry, and/or navigation, based on the robot kinematics (e.g., attention). The method can additionally or alternatively function to create 3D maps, create 3D videos, or for any other suitable purpose.

The method can be particularly useful in autonomous navigation applications for robots that are capable of translating along multiple axes, such as a quadcopter or drone. For example, different camera subsets can be selected and used for depth analysis when the robot is moving in different directions: right-facing cameras can be selected when the robot is moving rightward, left-facing cameras can be selected when the robot is moving leftward, and top-facing cameras can be selected when the robot is changing altitude. However, the method can be otherwise applied.

2. Benefits

The method and/or system can confer several benefits over conventional systems. First, the images recorded by the camera are processed on-board, in real- or near-real time. This allows the robot to navigate using the images recorded by the cameras. To reduce processing load, some variants of the method can selectively process image streams from a subset of the cameras, thereby reducing the amount of data to be analyzed. The robot can additionally or alternatively reduce processing load by monitoring a subset of the total possible monitored region (e.g., cooperatively monitored by the plurality of cameras). Second, in some variants, all or a subset of the cameras share a common storage device, ISP, and/or processor. This allows the processing system to dynamically access the sensor streams from any given camera. Third, this system can be cheaper than conventional multi-camera systems by, for example, processing the image streams from multiple cameras with a shared vision processor and/or by using a processor with lower performance than a processor of a conventional multi-camera system. Fourth, in some variants, this system and method can offer more coverage than conventional systems. In particular, conventional systems have predefined pairs of stereocameras, which limits the monitored regions to the overlapping region between the predefined stereocamera pair. In contrast, this system and method allows dynamic re-selection of different cameras, which allows stereocamera pairs to be dynamically formed; this allows the monitored regions to be expanded beyond the overlapping region between a single camera pair.

3. System.

As shown in FIG. 1, the method is preferably performed with a multi-camera system 100, which preferably includes: a housing 110 (e.g., mount), a plurality of cameras 120 statically fixed to the housing 110, memory, and a vision processor connected to the plurality of cameras. However, the method can be performed with any other suitable system. The system functions to sample images of a monitored region, such that specific image streams can be dynamically selected for real- or near-real time image processing, such as depth analysis. The system can additionally or alternatively generate 3D video, generate a map of the monitored region, or perform any other suitable functionality.

The housing functions to retain the plurality of cameras in a predetermined configuration. The housing can be polyhedral (e.g., tetrahedral, cuboidal, dodecahedron, such as shown in FIGS. 3A and 3B; icosahedron; segment of any of the above, such as shown in FIGS. 2A, 2B, and 2C; etc.), prismatic, spherical (e.g., semispherical, sphere segment, sphere zone, oblate, catenoid, etc.), cylindrical, conical, or have any other suitable shape. The system preferably includes a single housing that retains all cameras of the plurality, but can alternatively include multiple housing pieces or any other suitable number of housing pieces.

The plurality of cameras functions to sample signals of the ambient environment surrounding the system. The plurality of cameras are preferably arranged with the respective view cone (e.g., a camera view region 121 of any suitable shape, such as conical, pyramidal, frustal, etc.) of each camera overlapping a view cone of at least one adjacent camera, but can be arranged with contiguous view cones, separate view cones, or be otherwise arranged. The view cone preferably overlaps at least a predetermined proportion of the adjacent view cone, but can overlap the adjacent view cone by any other suitable proportion. The predetermined proportion is preferably determined based on the number of adjacent cameras (e.g., ⅙ of the adjacent view cone overlaps an adjacent view cone when the respective camera has 6 cameras surrounding it), but can be otherwise determined. The camera's view cone preferably overlaps the view cones of all adjacent cameras, but can alternatively overlap a subset of the adjacent cameras' view cones. The physical region cooperatively monitored by the plurality of cameras can be a sphere (e.g., 360° along all axes), a sphere zone (e.g., 360° in one plane), a sphere segment (e.g., 360° in one plane, less than 360° along perpendicular planes), or have any other suitable shape or coverage.

The camera can be a CCD camera, CMOS camera, or any other suitable type of camera. The camera can be sensitive in the visible light spectrum, IR spectrum, or any other suitable spectrum. The camera can be hyperspectral, multi-spectral, or capture any suitable subset of bands. The camera can include a wide-angle lens (e.g., fisheye lens, wide-angle rectilinear or substantially rectilinear lens), normal lens, or any other suitable lens with any suitable angle of view. The camera can have a fixed focal length, adjustable focal length, or any other suitable focal length. However, the camera can have any other suitable set of parameter values. The cameras of the plurality can be identical or different. Each camera is preferably individually indexed and controlled but can alternatively be controlled as a set or otherwise controlled.

Each of the plurality of cameras is preferably associated with a known location relative to a reference point (e.g., on the housing, a camera of the plurality, on the host robot, etc.), but can be associated with an estimated, calculated, or unknown location. The plurality of cameras are preferably statically mounted to the housing (e.g., through-holes in the housing), but can alternatively be actuatably mounted to the housing (e.g., by a joint). The cameras can be mounted to the housing faces, edges, vertices, or to any other suitable housing feature. The cameras can be aligned with, centered along, or otherwise arranged relative to the housing feature. The camera can be arranged with an active surface perpendicular a housing radius or surface tangent, an active surface parallel a housing face, or be otherwise arranged. Adjacent camera active surfaces can be parallel each other, at a non-zero angle to each other (e.g., defining an angle less than or greater than a threshold angle, such as 5°, 10°, 15°, 25°, 45°, 60°, 70°, 75°, 80°, 85°, 90°, 95°, 100°, 105°, 110°, 120°, 135°, 160°, 170°, 175°, 180°, between 0° and 180°, etc.), lie on the same plane, be angled relative to a reference plane, or otherwise arranged. Adjacent cameras preferably have a baseline (e.g., inter-camera or axial distance, distance between the respective lenses, etc.) of 6.35 cm, but can be further apart or closer together.

The mapping between pixels of each pair of adjacent cameras is preferably pre-determined (e.g., the cameras are pre-calibrated, such that the pixels of adjacent cameras directed to the same physical point are known), but can alternatively be dynamically determined or otherwise determined. The overlapping region between the cameras view cones (e.g., pixels from each camera in each overlapping region) is preferably predetermined, but can be dynamically determined or otherwise determined.

The cameras are preferably connected to the same visual processing system and memory, but can be connected to disparate visual processing systems and/or memories. The cameras are preferably sampled on the same clock, but can be connected to different clocks (e.g., wherein the clocks can be synchronized or otherwise related). The cameras are preferably controlled by the same processing system, but can be controlled by different processing systems. The cameras are preferably powered by the same power source (e.g., rechargeable battery, solar panel array, etc.; host robot power source, separate power source, etc.), but can be powered by different power sources or otherwise powered.

The system can optionally include an emitter that functions to illuminate a physical region monitored by the plurality of cameras. The system can include one emitter for each camera, one emitter for multiple cameras (e.g., mounted to a vertex between the camera mounting faces), multiple emitters for one camera (e.g., mounted surrounding the camera), no emitters, or any suitable number of emitters in any other suitable configuration. The emitter can emit modulated light, structured light (e.g., having a known pattern), collimated light, diffuse light, or light having any other suitable property. The emitted light can include wavelengths in the visible range, UV range, IR range, or in any other suitable range. The emitter position (e.g., relative to a given camera) is preferably known, but can alternatively be estimated, calculated, or otherwise determined.

Figure 8:
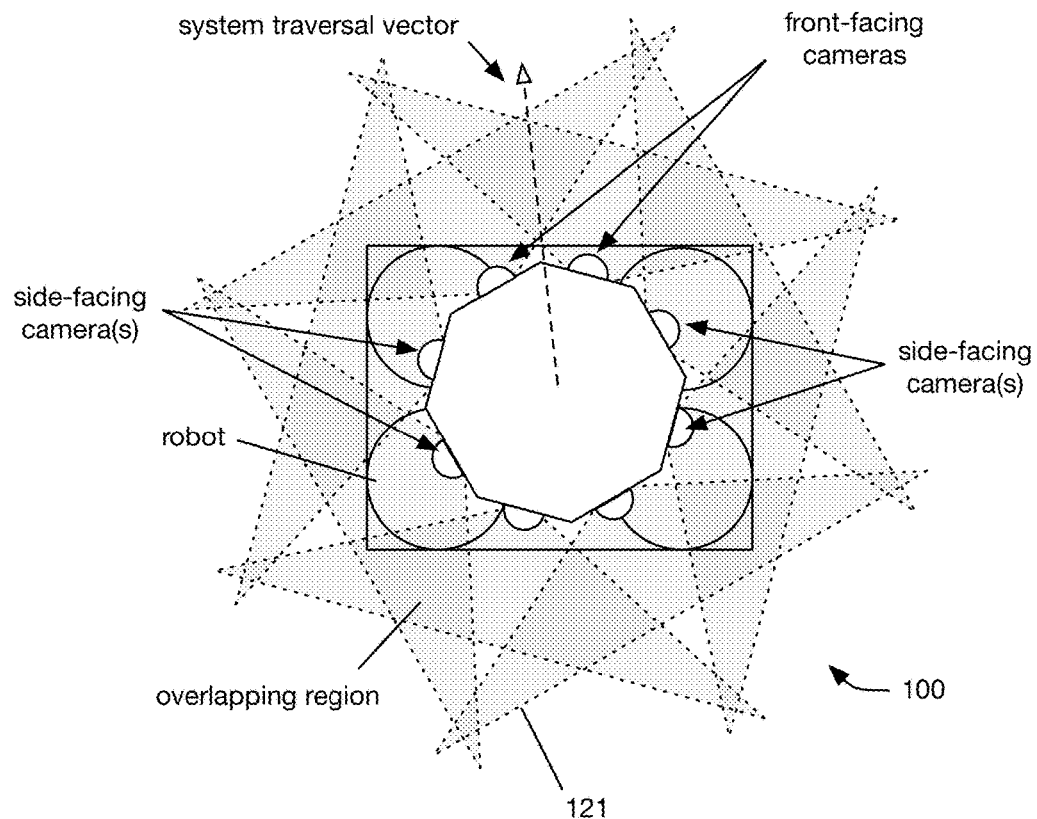
Figure 9:
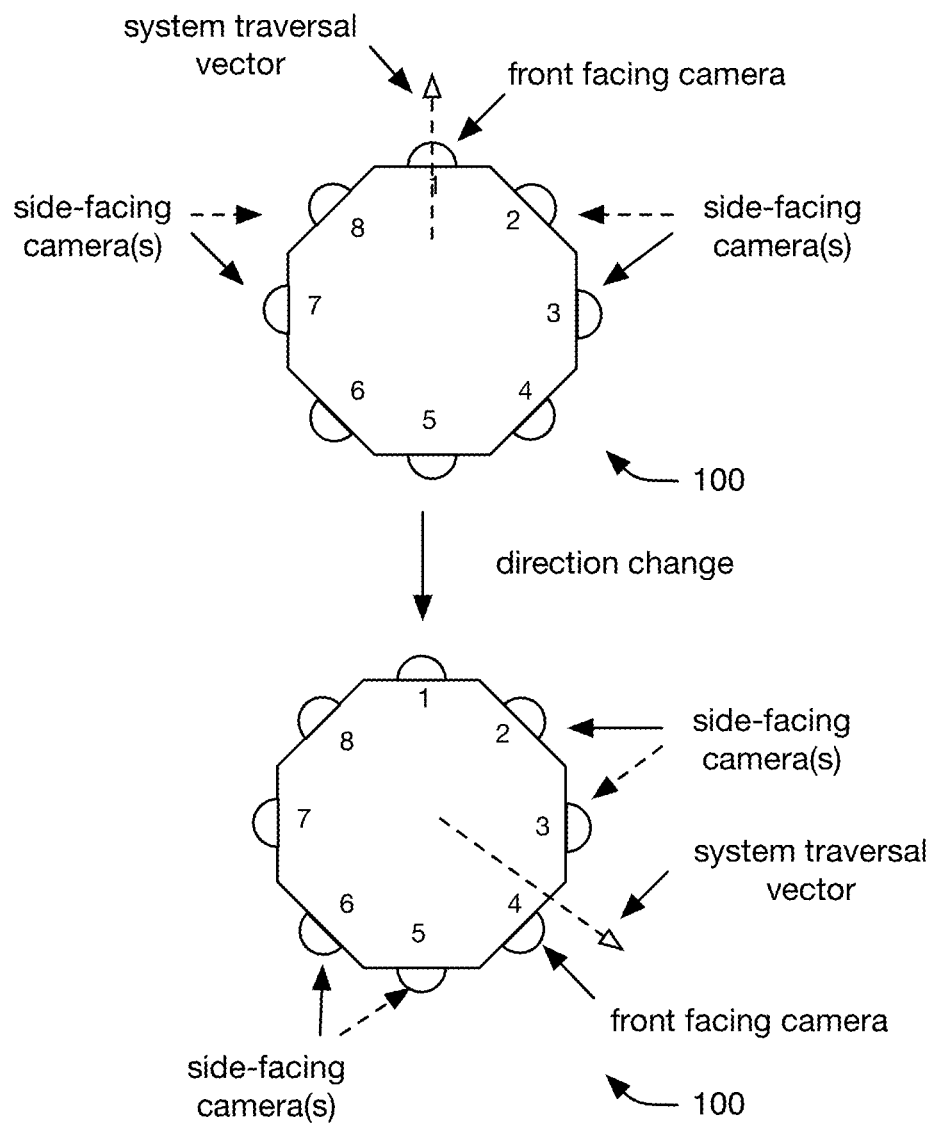
FIGS. 9 and 10 are a first and second example, respectively, of dynamic camera subset redetermination based on new system traversal vectors.
Figure 10:
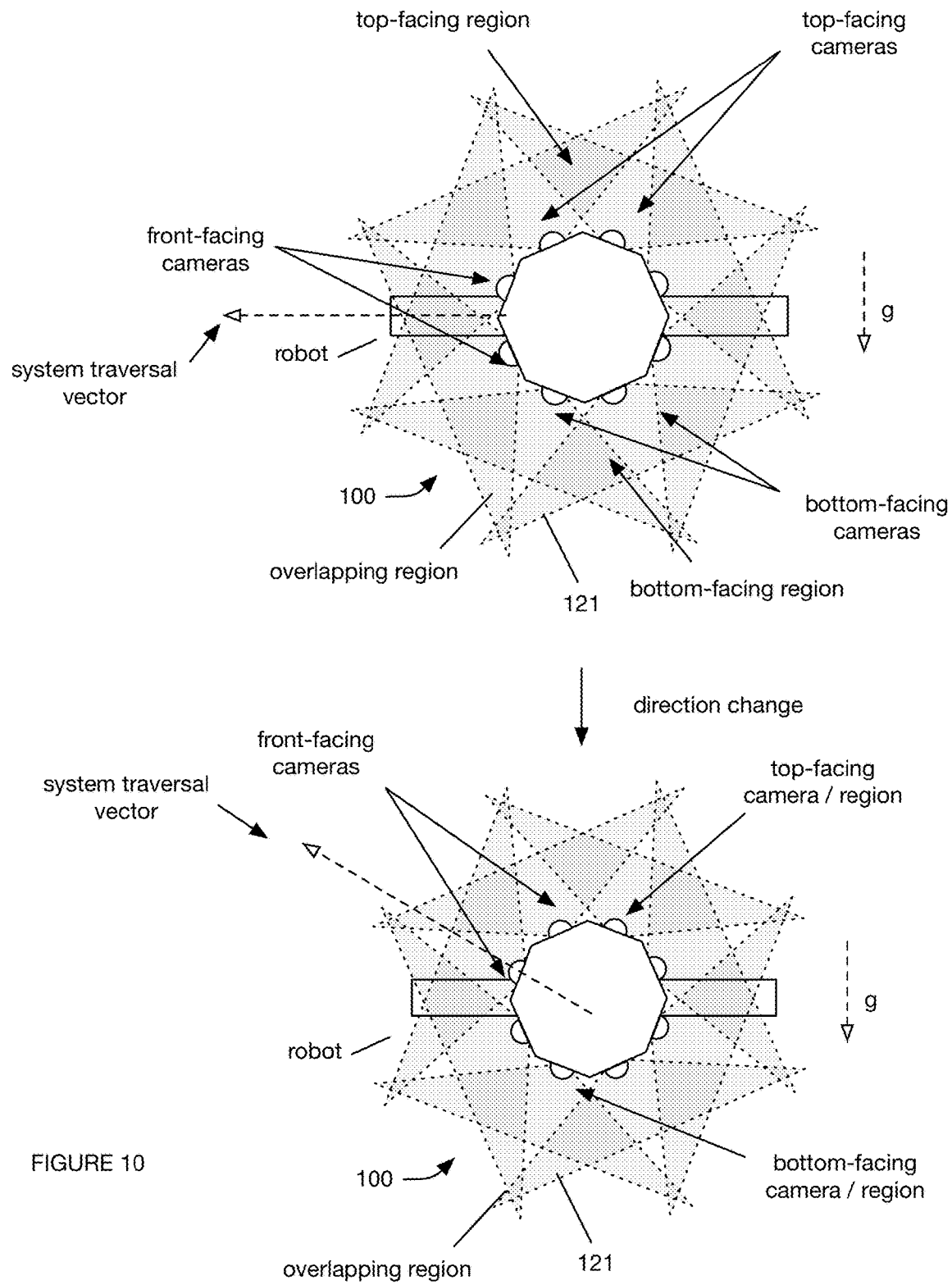

In one variation, the optical system is a multi-stereocamera system (example shown in FIG. 8). In a first embodiment, the multi-stereocamera system includes a plurality of cameras, each with a view cone overlapping its neighbors' view cones. In one example, the ratio between the camera's angle of view and the intra-camera distance is selected such that the overlapping regions cooperatively encompass most (e.g., 90%) or the entirety of the camera's field of view and/or view cone. In a second example, the ratio between the angle of view and the intra-camera distance is larger than the first embodiment, such that less than a threshold percentage of the camera's field of view and/or view cone is overlapped by adjacent cameras' view cones. However, the cameras can be otherwise arranged and configured. In this embodiment, stereocamera pairs can be dynamically selected and/or defined by dynamically selecting a first and a second camera with an overlapping field of view.

In second embodiment, the multi-stereocamera system includes a plurality of discrete stereocamera pairs, wherein the cameras within each pair have overlapping view cones. The cameras of each pair preferably define central view axes (e.g., axis centered within the camera view region, optical axis, etc.) of similar orientations (e.g., substantially parallel axes; axes defining an angle less than a threshold angle, such as 5°, 10°, 15°, 25°, 45°, 60°, 75°, 90°, between 0° and 180°, etc.), but can alternatively have any suitable orientation relative each other. The cameras of separate pairs preferably define central view axes of significantly different orientations (e.g., substantially non-parallel axes; substantially perpendicular axes; axes defining an angle greater than a threshold angle, such as 5°, 10°, 15°, 25°, 45°, 60°, 70°, 75°, 80°, 85°, 90°, 95°, 100°, 105°, 110°, 120°, 135°, 160°, between 0° and 180°, etc.), but can alternatively have any suitable orientation relative each other.

Figure 11A:
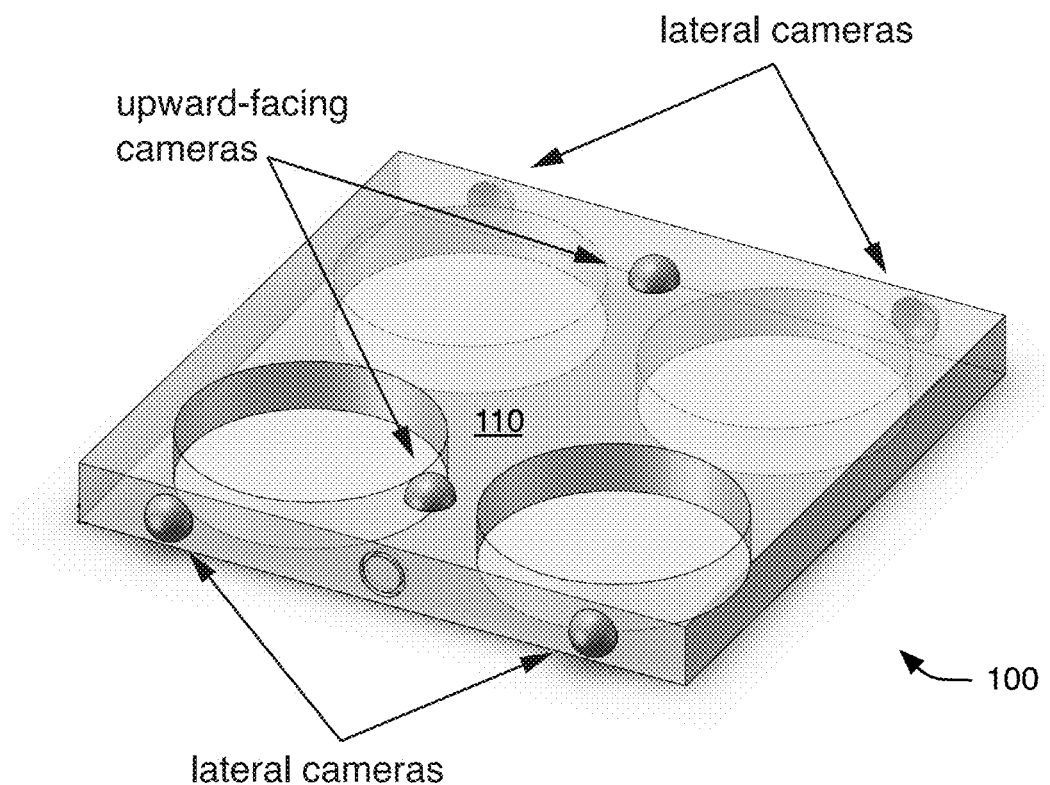
FIGS. 11A-11D are a perspective view, a side view, a front view, and a detail region of the front view, respectively, of a third example of the system.
Figure 11B:
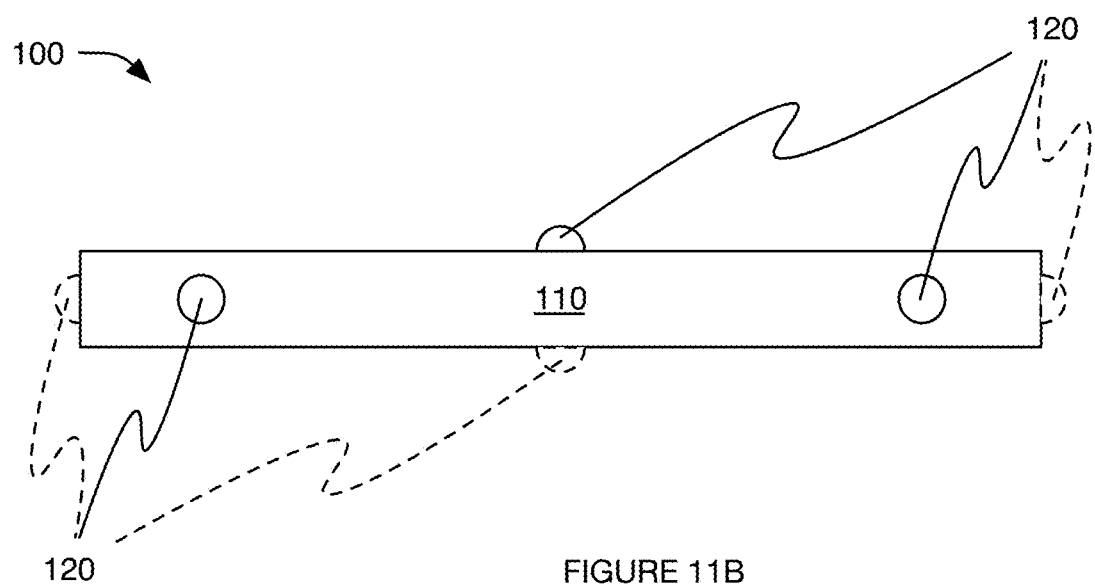
Figure 11C:
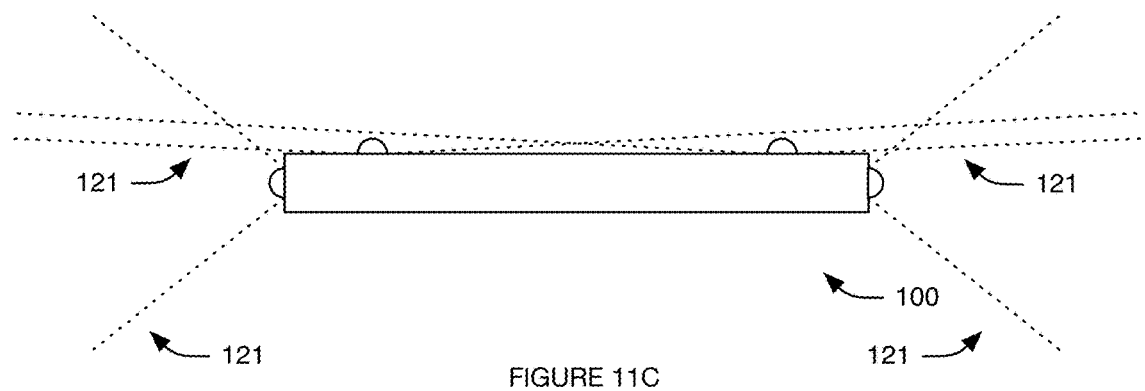
Figure 11D:
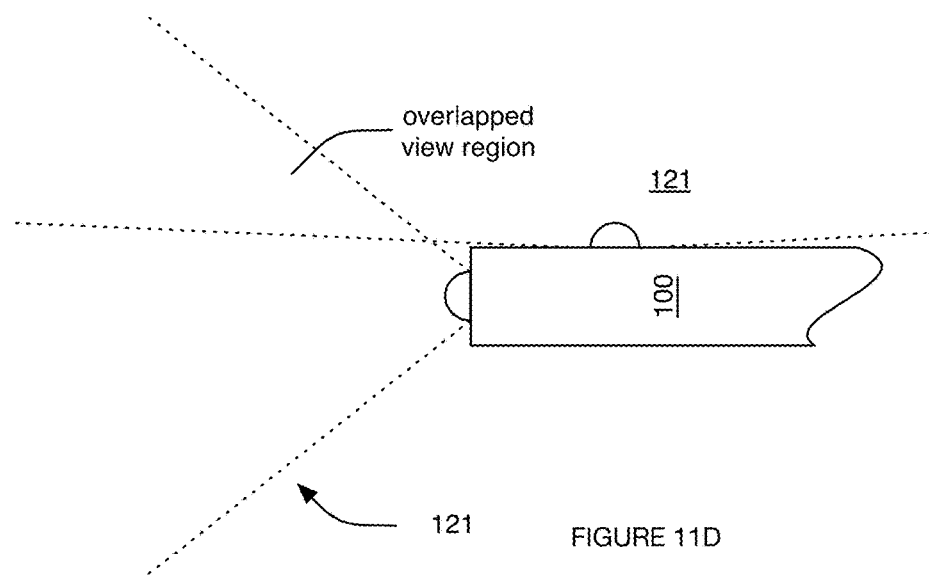

In one example of this embodiment, some or all faces of a system housing include one or more such stereocamera pairs (and/or individual cameras), such as a housing substantially defining a cuboid (e.g., right cuboid) with a stereocamera pair on one or more of the six housing faces. In this example, the system preferably includes a lateral stereocamera pair on its front face, a lateral stereocamera pair on its rear face, and an upward-facing stereocamera pair on its top face, and can additionally or alternatively include lateral stereocamera pairs on one or both side faces, a downward-facing stereocamera pair on its bottom face, and/or any other suitable cameras in any other suitable arrangement (e.g., as shown in FIGS. 11A-11B). The cameras within each stereocamera pair are preferably of the same camera type, but can alternatively be different camera types. The stereocamera pairs of the system are preferably of the same camera type, but can alternatively be different camera types. In a specific example, the lateral cameras each include a rectilinear (or substantially rectilinear) lens, such as a wide-angle rectilinear lens, and the upward- and/or downward-facing cameras each include a fisheye lens. In this embodiment, the camera view cones can optionally overlap view cones of one or more other cameras (e.g., cameras of other stereocamera pairs, unpaired cameras of the system, etc.). For example, the view cone of each upward- and/or downward-facing camera can overlap the view cone of each lateral camera (e.g., as shown in FIGS. 11C-11D). In this embodiment, pre-defined stereocamera pairs can be dynamically selected (e.g., based on the system traversal vector; kinematic parameter such as velocity or acceleration; ambient environment parameter such as light or sound; the system's local or global position; etc.), and/or can be selected in any other suitable manner. However, the system can define any other suitable multi-stereocamera system.

Figure 7:
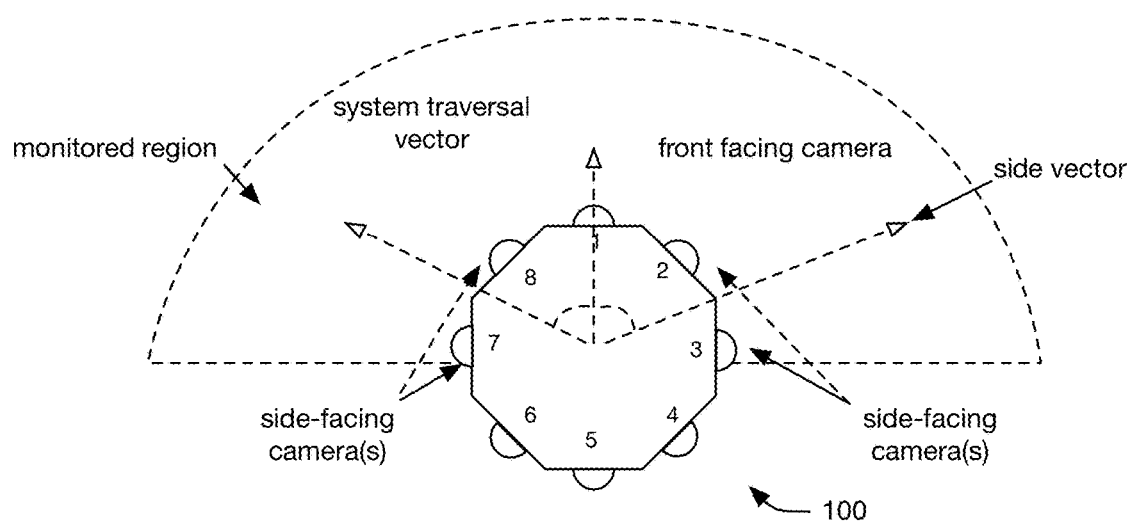
FIGS. 7 and 8 are a first and second example, respectively, of the camera subset determined based on the system traversal vector.

In a second variation, the optical system is a non-contact active 3D scanner (example shown in FIG. 7). In a first variation, the non-contact system is a time of flight sensor, including a camera and an emitter, wherein the camera records reflections (of the signal emitted by the emitter) off obstacles in the monitored region and determines the distance between the system and the obstacle based on the reflected signal. The camera and emitter are preferably mounted within a predetermined distance of each other (e.g., several mm), but can be otherwise mounted. The emitted light can be diffuse, structured, modulated, or have any other suitable parameter. In a second variation, the non-contact system is a triangulation system, also including a camera and emitter. The emitter is preferably mounted beyond a threshold distance of the camera (e.g., beyond several mm of the camera) and directed at a non-parallel angle to the camera active surface (e.g., mounted to a vertex of the housing), but can be otherwise mounted. The emitted light can be collimated, modulated, or have any other suitable parameter. However, the optical system can define any other suitable non-contact active system. However, the plurality of cameras can form any other suitable optical rangefinding system.

The memory of the system functions to store camera measurements. The memory can additionally function to store settings; maps (e.g., calibration maps, pixel maps); camera positions or indices; emitter positions or indices; or any other suitable set of information. The system can include one or more pieces of memory. The memory is preferably nonvolatile (e.g., flash, SSD, eMMC, etc.), but can alternatively be volatile (e.g. RAM). In one variation, all cameras write to the same buffer, wherein each camera is assigned a different portion of the buffer. In a second variation, the cameras each write to different buffers in the same or different memory. However, the cameras can write to any other suitable memory. The memory is preferably accessible by all processing systems of the system (e.g., vision processor, application processor), but can alternatively be accessible by a subset of the processing systems (e.g., a single vision processor, etc.).

The vision processing system of the system functions to determine the distance of a physical point from the system. The vision processing system preferably determines the pixel depth of each pixel from a subset of pixels, but can additionally or alternatively determine the object depth or determine any other suitable parameter of a physical point or collection thereof (e.g., object). The vision processing system preferably processes the sensor stream from a subset of the plurality of cameras (e.g., less than all the cameras), but can alternatively process the sensor stream from all the cameras. The camera subset can include one or more cameras. The camera subset is preferably selected by the application processing system (e.g., wherein the vision processing system receives the camera identifiers from the application processor, selects the sensor streams associated with said identifiers, and processes said sensor streams), but can alternatively be selected by the vision processing system or by any other suitable processing system. The vision processing system preferably processes each sensor stream at a predetermined frequency (e.g., 30 FPS; processing frequency equal to the image capture frequency of the cameras; processing frequency selected such that the image capture frequency is an integer multiple of the processing frequency, such as by processing every second, third, fourth, or eighth frame captured; etc.), but can process the sensor streams at a variable frequency or at any other suitable frequency. The predetermined frequency can be received from the application processing system, retrieved from storage, automatically determined based on a camera score or classification (e.g., front, side, back, etc.), determined based on the available computing resources (e.g., cores available, battery level remaining, etc.), or otherwise determined. In one variation, the vision processing system processes multiple sensor streams at the same frequency. In a second variation, the vision processing system processes multiple sensor streams at different frequencies, wherein the frequencies are determined based on the classification assigned to each sensor stream (and/or source camera), wherein the classification is assigned based on the source camera orientation relative to the host robot's travel vector. In one example, images from the front-facing camera(s) (e.g., overlapped region) are processed at 30 FPS, while the images from the side-facing camera(s) are processed at 15 FPS. In a second example, 50% of the computing power is dedicated to processing images from the front-facing camera(s), while 25% is dedicated to processing images from each of the side-facing camera(s). However, computing resources can be otherwise divided. The vision processing system can include one or more vision processors. The vision processor can include a CPU, GPU, microprocessor, or any other suitable processing system.

The application processing system of the system functions to select the camera subset(s) for image processing by the vision processing system. The application processing system can additionally or alternatively determine the time multiplexing parameters for the sensor streams. The application processing system can additionally or alternatively perform object detection, classification, tracking (e.g., optical flow), or any other suitable process using the sensor streams. The application processing system can additionally or alternatively generate control instructions based on the sensor streams (e.g., based on the vision processor output). For example, navigation (e.g., using SLAM, RRT, etc.) or visual odometry processes can be performed using the sensor streams, wherein the system and/or host robot is controlled based on the navigation outputs.

The application processing system can additionally or alternatively receive control commands and operate the system and/or host robot based on the commands. The application processing system can additionally or alternatively receive external sensor information and selectively operate the system and/or host robot based on the commands. The application processing system can additionally or alternatively determine robotic system kinematics (e.g., position, direction, velocity, acceleration) based on sensor measurements (e.g., using sensor fusion). In one example, the application processing system can use measurements from an accelerometer and gyroscope to determine the traversal vector of the system and/or host robot (e.g., system direction of travel; a component thereof, such as a horizontal component, vertical component, component parallel or normal to an edge, central axis, and/or face defined by the system, such as a predetermined axis or plane described below, etc.). The application processing system can optionally automatically generate control instructions based on the robotic system kinematics. For example, the application processing system can select the camera subset based on the direction of travel and determine the location of the system (in a physical volume) based on images from the camera subset (e.g., using SLAM), wherein the relative position (from the orientation sensors) and actual position and speed (determined from the images) can be fed into the flight control module. In this example, images from a downward-facing camera subset can be used to determine system translation (e.g., using optical flow), wherein the system translation can be further fed into the flight control module. In a specific example, the flight control module can synthesize these signals to maintain the robot position (e.g., hover a drone).

The application processing system can include one or more application processors. The application processor can be a CPU, GPU, microprocessor, or any other suitable processing system. The application processing system can be the vision processing system, or be different from the vision processing system. The application processing system is preferably connected to the visual processing system by one or more interface bridges. The interface bridge can be a high-throughput and/or bandwidth connection, and can use a MIPI protocol (e.g., 2-input to 1-output camera aggregator bridges—expands number of cameras that can be connected to a vision processor), a LVDS protocol, a DisplayPort protocol, an HDMI protocol, or any other suitable protocol. Alternatively or additionally, the interface bridge can be a low-throughout and/or bandwidth connection, and can use a SPI protocol, UART protocol, I2C protocol, SDIO protocol, or any other suitable protocol.

The system can optionally include an image signal processing unit (ISP) that functions to pre-process the camera signals (e.g., images) before passing to vision processing system and/or application processing system. The ISP can process the signals from all cameras, the signals from the camera subset, or signals any other suitable source. The ISP can auto-white balance, correct field shading, rectify lens distortion (e.g., dewarp), crop, select a pixel subset, apply a Bayer transformation, demosaic, apply noise reduction, sharpen the image, or otherwise process the camera signals. For example, the ISP can select the pixels associated with an overlapping physical region between two cameras from images of the respective streams (e.g., crop each image to only include pixels associated with the overlapping region shared between the cameras of a stereocamera pair). The ISP can be a system on a chip with multi-core processor architecture, be an ASIC, have ARM architecture, be part of the vision processing system, be part of the application processing system, or be any other suitable processing system.

The system can optionally include sensors that function to sample signals indicative of system operation. The sensor output can be used to determine system kinematics, process the images (e.g., used in image stabilization), or otherwise used. The sensors can be peripheral devices of the vision processing system, the application processing system, or of any other suitable processing system. The sensors are preferably statically mounted to the housing but can alternatively be mounted to the host robot or to any other suitable system. Sensors can include: spatial sensors (e.g., IMU, gyroscope, accelerometer, altimeter, magnetometer, other orientation sensors, etc.), acoustic sensors (e.g., microphones, transducers, etc.), optical sensors (e.g., cameras, ambient light sensors, optical emitter sensors, etc.), touch sensors (e.g., force sensors, capacitive touch sensor, resistive touch sensor, thermal touch sensor, etc.), location sensors (e.g., GPS system, beacon system, trilateration system), or any other suitable set of sensors.

The system can optionally include inputs (e.g., a keyboard, touchscreen, microphone, etc.), outputs (e.g., speakers, lights, screen, vibration mechanism, etc.), communication system (e.g., a WiFi module, BLE, cellular module, etc.), power storage (e.g., a battery), or any other suitable component.

The system is preferably used with a host robot that functions to traverse within a physical space. The host robot can additionally or alternatively receive remote control instructions and operate according to the remote control instructions. The host robot can additionally generate remote content or perform any other suitable functionality. The host robot can include one or more: communication modules, motive mechanisms, sensors, content-generation mechanisms, processing systems, reset mechanisms, or any other suitable set of components. The host robot can be a drone (e.g., unmanned vehicle, such as an unmanned aerial vehicle), vehicle, robot, security camera, or be any other suitable remote-controllable and/or autonomous system. The motive mechanism can include a drivetrain, rotors, jets, treads, rotary joint, or any other suitable motive mechanism. The application processing system is preferably the host robot processing system, but can alternatively be connected to the host robot processing system or be otherwise related. In a specific example, the host robot includes an aircraft (e.g., rotorcraft, such as a helicopter, quadcopter, or other multi-rotor aircraft; fixed-wing aircraft; etc.), such as an autonomous and/or remote-controllable aircraft aerial system (e.g., drone), preferably including a wireless communication module such as a WiFi module, one or more cameras, and the application processing system. The system can be mounted to the top of the host robot (e.g., as determined based on a gravity vector during typical operation), the bottom of the host robot, the front of the host robot, centered within the host robot, or otherwise mounted to the host robot. The system can be integrally formed with the host robot, removably coupled to the host robot, or otherwise attached to the host robot. One or more systems can be used with one or more host robots.

4. Method.

As shown in FIG. 5, the method of using a multi-camera system includes: selecting a camera subset from a plurality of cameras; determining a pixel depth for each pixel of a pixel subset, the pixel subset captured by the camera subset; and dynamically controlling robot operation based on the determined pixel depth. The method is preferably performed in real- or near-real time, but can alternatively be performed asynchronously or at any other suitable time. Processes of the method are preferably performed sequentially, but can alternatively be performed in parallel or in any other suitable order. Multiple instances of the method (or portions thereof) can be concurrently or serially performed for each system. The method can be performed at a predetermined frequency (e.g., lower than the image sampling rate, equal to the sampling rate, etc.), determined in response to occurrence of a detection event (e.g., in response to a orientation sensor measurement change over a threshold change), or at any other suitable time.

Selecting a camera subset from a plurality of cameras can function to limit the number of sensor streams to be processed at a given time and/or to prioritize processing of images from selected cameras. The camera subset can include a single camera, a camera pair, a plurality of discrete camera pairs, a plurality of overlapping camera pairs (e.g., wherein two camera pairs share a camera), or any suitable number of cameras. The camera subset can be selected based on the system traversal direction (e.g., system velocity vector), system orientation (e.g., angle with respect to a reference plane or vector, such as a gravity vector, floor, ceiling, wall, etc.), based on the physical location of the system (e.g., GPS location), and/or otherwise determined. This is preferably performed by the application processing system but can alternatively be performed by the robot processing system or by any other suitable processing system.

Figure 6:
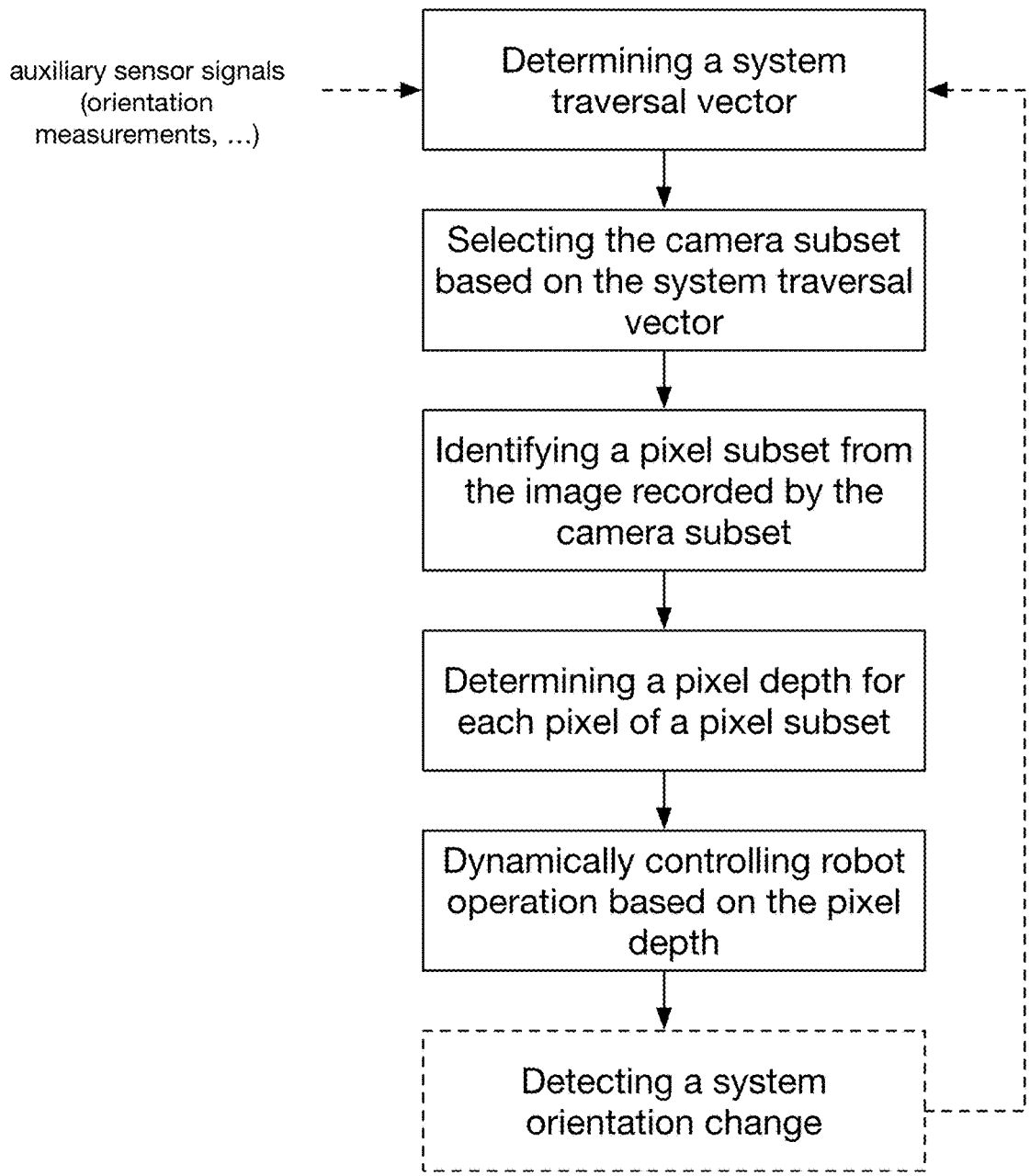
FIG. 6 is a flowchart representation of an example of the method.

As shown in FIG. 6, selecting the camera subset based on the system traversal direction can include: determining the system traversal vector and selecting a camera subset associated with the system traversal vector, but can include any other suitable process.

Determining the system traversal vector functions to determine the heading or attitude of the system and/or host robot. The system traversal vector is preferably determined relative to a reference point on the system and/or host robot (e.g., center of the system, center of the robot, etc.), but can be otherwise defined. In a first variation, the system traversal vector is determined based on the orientation sensor measurements (e.g., the vector with the largest acceleration magnitude, as measured by the accelerometer). In a second variation, the system traversal vector is determined using optical flow techniques (e.g., using object tracking on images recorded by a downward-facing camera). In a third variation the system traversal vector is determined based on host robot motive mechanism operation parameters (e.g., the wheels' rotary encoders, the rotors' rotary encoders, the relative power provided to each motor, etc.). In a fourth variation, the system traversal vector is determined based on control instructions (e.g., automatically generated or received from a remote control system), wherein the system traversal vector can be an expected system traversal vector instead of an actual system traversal vector. In a fifth variation, the system traversal vector is determined by collecting sensor raw data from IMU, barometer, GPS, optical flow, sonar, and/or other on-board sensors, then applying state estimation techniques such as EKF, UKF, or PF. However, the system traversal vector can be otherwise determined.

Selecting a camera subset associated with the system traversal vector functions to select cameras monitoring a physical region associated with host robot navigation (e.g., as shown in FIGS. 7-10). The cameras can be selected: before or after the respective images are selected, the pixel subsets are selected, in response to a kinematic condition or orientation condition occurring (e.g., velocity exceeding a predetermined threshold; roll, pitch, or yaw angle exceeding a predetermined threshold; etc.), be predetermined, when an expected object is detected in the cameras' field of view, when an expected object is not detected within the cameras' field of view, or be selected at any suitable time. The selected camera subset preferably includes cameras that monitor the physical region ahead of the robot (e.g., forward-looking cameras), in the direction of travel (e.g., proximal the system, along the system traversal vector) and/or a component thereof (e.g., lateral component, vertical component, component parallel or perpendicular a reference structure of the robot, such as described above, etc.), which functions to monitor the anticipated traversal path for obstacles. The selected camera subset can additionally or alternatively include cameras that monitor the physical region to the side of the robot (e.g., at a predetermined angle to the system traversal vector, such as perpendicular to the vector), above the robot, and/or below the robot (e.g., directly above and/or below; at an oblique angle to both a gravity vector and the system traversal vector, such as halfway between the two vectors; etc.), which functions to monitor for side-, bottom-, and/or top-impact (e.g., due to other objects traversing within the space such as other host robots, users, structures such as walls, ceilings, floors, and/or other fixed obstacles, etc.). The region collectively monitored by the cameras within the selected subset (total monitored region, example shown in FIG. 7) can encompass a predetermined angular region defined from the system traversal vector, but can be otherwise defined. The total monitored region can be entirely monitored, partially monitored (e.g., include gaps), or otherwise monitored. The angular region can be centered about the system traversal vector, asymmetrically aligned with the system traversal vector, offset from the system traversal vector, or otherwise arranged relative to the system traversal vector. The angular region arrangement relative to the system traversal vector can be predetermined (e.g., static), dynamically determined (e.g., based on speed, acceleration, location, etc.), or otherwise determined. The angle of the angular region can be static or dynamic (e.g., vary as a function of speed, acceleration, location, number of secondary systems detected within the physical space using the sensor streams, number of secondary systems connected to a common communication channel, etc.). The angle can be 90°, 180°, 360°, or any other suitable angle. The angle can be defined along a plane encompassing the system traversal vector (e.g., substantially parallel or perpendicular a gravity vector, etc.), parallel the system traversal vector, perpendicular the system traversal vector, or defined in any other suitable plane.

Selecting the camera subset preferably includes selecting a group of one or more forward-looking cameras (e.g., cameras that include the system traversal vector in their field of view). Selecting the group of forward-looking cameras preferably includes selecting one or more front-facing cameras, and can additionally or alternatively include selecting auxiliary forward-looking cameras (e.g., side-, top-, and/or bottom-facing cameras).

Selecting the camera subset can additionally or alternatively include selecting one or more auxiliary groups of one or more cameras, such as sideward-looking cameras, upward- and/or downward-looking cameras, backward-looking cameras, and/or any other suitable cameras of any suitable orientations. In one variation, specific sets of analyses algorithms or processes (e.g., object detectors, feature detectors, pose detectors, navigation methods, etc.) can be applied to the images and/or video sampled by specific camera classes or cameras labeled with predetermined labels (e.g., forward-looking camera, right-looking camera, left-looking camera, backward-looking cameras, downward-looking camera, etc.). For example, a first obstacle detection and avoidance algorithm (e.g., an algorithm for detecting, and avoiding, obstacles in the navigation path) can be run on the images sampled by the cameras labeled as the forward-looking cameras, while a second obstacle detection algorithm (e.g., an algorithm for detecting and maintaining a predetermined distance from a flat surface, such as a floor) can be run on the images sampled by the cameras labeled as downward-looking cameras and/or upward-looking cameras. A third obstacle detection algorithm can optionally be selectively executed on images sampled by cameras labeled as backward-looking cameras, such as when the navigation instructions command rearward flight. The algorithms can be dynamically re-assigned to different image streams when the camera labels change (e.g., when a new camera subset is selected). Alternatively or additionally, other algorithms can be assigned to image streams based on the source cameras' labels; the same algorithms can be run on all image streams; all or part of the image streams can be selectively discarded based on the source cameras' labels; or the camera assignments can be otherwise used. However, the camera subset can be otherwise selected.

Selecting the front-facing camera preferably functions to select the camera(s) most proximal the system traversal vector. One or more front-facing cameras can be selected. In a first variation, the front-facing camera(s) can be a camera pair cooperatively defining an overlapping region encompassing the system traversal vector. In a second variation, the front-facing camera can be a single camera with a view cone or FOV encompassing the system traversal vector. However, the front-facing camera can be any other suitable camera.

In a first variation, selecting the front-facing camera includes selecting the camera(s) based on the system traversal vector. The front-facing camera(s) can be associated with the system traversal vector through the overlapping region shared by the camera and a paired camera, through the camera FOV or view cone, or otherwise associated with the system traversal vector. In one embodiment, the overlapping region of the front-facing camera pair can be pre-associated with a set of vectors, wherein the system traversal vector is one of the set. In a second embodiment, the overlapping region of the front-facing camera pair encompasses (e.g., is aligned with) the system traversal vector. In a third embodiment, the front-facing camera pair can be pre-associated with a set of vectors, including the system traversal vector. In a fourth embodiment, each camera (and/or view cone, FOV, etc.) is associated with a set of vectors (e.g., measured relative to the reference point), wherein the front-facing camera is associated with a vector set including the system traversal vector. In a fifth embodiment, the front-facing camera FOV and/or view cone encompasses (e.g., is aligned with) the system traversal vector. In the third and fourth embodiments, the system can automatically select all cameras having vector sets including the system traversal vector, or otherwise select the cameras. In a first example in which the cameras cooperatively form stereocamera pairs (example shown in FIG. 8), this can dynamically select the cameras forming the stereocamera pair (e.g., in system embodiments in which the system traversal vector is in both vector sets, such as for a pair of identical cameras with identical orientation and a coplanar arrangement on a plane normal each camera's central view axis). In a second example in which the camera is part of a non-contact active system (example shown in FIG. 7), this can dynamically select the camera(s) (and/or non-contact optical system) oriented in the system traversal vector. In this example, the vectors within each set can be weighted, scored, associated with a relative position, or otherwise ranked, wherein the camera with the system traversal vector closest to the center of the respective view cone can be selected as the front-facing camera. In a sixth variation, the front facing camera can be the camera closest to the system traversal vector and/or housing point intersecting the system traversal vector. However, competing cameras can be otherwise selected. However, the front-facing camera can be otherwise selected based on the system traversal vector.

In a second variation, selecting the front-facing camera includes determining a sensor signal value (e.g., accelerometer value) and identifying the camera identifier(s) based on the sensor signal value (e.g., based on a lookup table). However, the front-facing camera can be otherwise selected.

Selecting the front-facing camera can additionally include selecting an emitter. The emitter can be pre-associated with the front-facing camera, the emitter associated with an illumination cone encompassing the system traversal vector or an illumination vector determined based on the system traversal vector (e.g., calculated from the system traversal vector for triangulation measurements), or otherwise determined.

Selecting the auxiliary forward-looking cameras functions to select additional cameras that can contribute to forward imaging (e.g., cameras whose view regions overlap one or more other forward-looking cameras, such as one or more of the front-facing cameras). Selecting auxiliary forward-looking cameras can include selecting side-facing cameras, upward- and/or downward-facing cameras, and/or any other suitable cameras. Side-, upward- and/or downward-facing cameras can be selected for the group of forward-looking cameras, and/or for one or more auxiliary groups of cameras.

Selecting the auxiliary (e.g., side-, upward-, downward-, and/or rear-facing) cameras can function to select the cameras arranged an angular distance from the front-facing camera, to select cameras with overlapping and/or complementary view regions to the front-facing camera, and/or have any other suitable function. The angular distance can be predetermined, calculated (e.g., as a function of the system speed, acceleration, etc.), or otherwise determined. The angular distance is preferably defined relative to a predetermined plane or axis of the system or host robot (e.g., lateral plane, transverse plane, etc.), but can alternatively be defined relative to a gravity vector, the system angular pose, or any other suitable reference point. The predetermined plane or axis can be predetermined, determined based on the system orientation (e.g., from the system pitch, yaw, roll, etc.), or otherwise determined. In one example, a first set of cameras can be selected when the host robot is substantially flat (e.g., no roll), and a second set of cameras can be selected when the host robot is rolled clockwise 90°. The side-facing camera can be selected based on the front-facing camera (e.g., based on the known relative locations of the cameras), based on the system traversal vector, or otherwise determined. The side-facing camera can be physically adjacent the front-facing cameras, separated by intervening cameras, or otherwise related to the front-facing cameras.

In a first variation, the front-facing camera is associated with a predefined set of side-facing cameras. In a second variation, the side-facing cameras are cameras arranged a predetermined number of cameras away from the front-facing cameras (e.g., along a predetermined axis or plane, surrounding the front-facing cameras, etc.). In a third variation, the side-facing cameras are cameras arranged within or separated by the angular distance of the front-facing camera (example shown in FIG. 7). In a third variation, the side-facing cameras are those associated with a side vector (e.g., in a similar manner to how the front-facing camera is associated with the system traversal vector), wherein the side vector is separated by a separation angle from the system traversal vector. The separation angle can be the angular distance, be one of a set of distances, or be any other suitable angle. However, the side-facing cameras can be otherwise defined. For example, the side-facing cameras can be the two camera sets to stage right and to stage left of the front-facing camera (e.g., to the right and left of the front-facing camera, from the perspective of the front-facing camera and/or the system traversal vector), wherein the shared axis between the front- and side-facing cameras is substantially perpendicular a gravity vector. The side-facing cameras can be determined based on a known relative position between the cameras and the system orientation.

Selecting the auxiliary group(s) of cameras preferably functions to select additional cameras for use in image processing, such as to supplement situational awareness (e.g., to provide information about robot surrounding in directions other than the direction of robot traversal).

In a first variation, the auxiliary groups of cameras are selected analogously to selecting the forward-looking cameras (e.g., using an alternate direction in place of the system traversal vector). In one example, one or more auxiliary groups can be selected based on a vector at a predefined angle to the system traversal vector (e.g., rotated about a central axis of the system or host robot; rotated about an external reference such as a gravity vector or a vector normal a reference plane, such as a floor, wall, or ceiling; etc.), such as 90° (e.g., for a sideward-looking camera group) or 180° (e.g., for a rearward-looking camera group). In a second example, one or more auxiliary groups can be selected based on one or more internal and/or external reference vectors (e.g., central axis of the system or host robot, gravity vector, vector normal a reference plane, etc.), such as defining a downward-looking camera group and an upward-looking camera group based on a gravity vector and its opposite. In a second variation, the auxiliary groups are pre-defined. For example, an upward-looking camera group can be pre-defined to include all the upward-facing cameras, and a downward-looking camera group can be predefined to include all the downward-facing cameras. However, the auxiliary groups of cameras can additionally or alternatively be selected in any other suitable manner.

One example of selecting the camera subset (e.g., in which the system includes one or more stereoscopic camera pairs, such as lateral pairs and an upward-facing pair, defined on different sides of a rectangular cuboid housing) includes selecting a forward-looking camera group and an upward-looking camera group. The forward-looking camera group includes the front-facing camera pair (e.g., as described above), and can optionally include one or more of the upward- and/or downward-facing cameras (e.g., the cameras arranged closest to the front-facing camera pair, all such cameras, etc.). For example, in a system in which the upward-facing cameras each include a fisheye lens, a substantial portion of their view region can overlap one or more of the front-facing cameras (e.g., as shown in FIGS. 11C-11D).

Figure 12A:
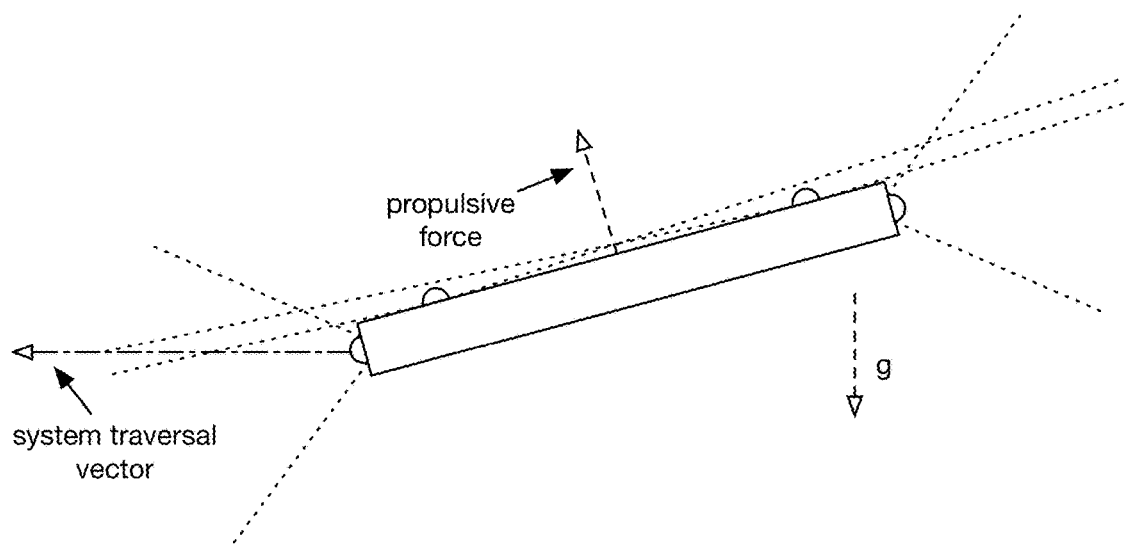
FIGS. 12A-12B are front views of the third example of the system in motion, shown without and with nearby obstacles, respectively.

In a specific example (e.g., wherein the system or host robot includes an aircraft, such as a quadcopter, other rotorcraft, or fixed-wing aircraft), the system may tilt (e.g., tilt automatically, such as in response to flight control actuation) toward the system traversal vector, system thrust vector, and/or system acceleration vector (e.g., as shown in FIG. 12A). Such system tilting will typically tilt the upward-facing cameras toward the front (e.g., toward the system traversal vector), which can increase the portion of upward-facing camera view regions that include regions in front of the system and/or host robot. Thus, in this specific example, one or more upward-facing cameras are preferably included (e.g., as auxiliary cameras) in the forward-looking camera group. Analogously, the downward-facing cameras will tilt toward the rear, and therefore may be less well adapted for use in the forward-looking camera group but better adapted for use in the backward-looking camera group. However, in circumstances in which the system tilts in the opposite direction (e.g., during system deceleration), the downward-facing cameras will then tilt toward the front and the upward-facing cameras will then tilt toward the rear, and so under such circumstances, the forward-looking camera group can be modified accordingly (e.g., to include one or more downward-facing cameras, exclude one or more previously-included upward-facing cameras, etc.), as can the backward-looking camera group and/or any other auxiliary camera group.

The method can additionally or alternatively include determining the processing parameters for the image streams from each camera. Processing parameters can include: the amount of resources dedicated to each stream (e.g., cores, threads, cycles, processing frequency, number of cycles), the processing priority for each stream (e.g., wherein high priority streams are processed before low priority streams), or any other suitable set of parameters. Sampling parameters, such as sampling frequency, can also be determined. The parameters for each stream can be pre-assigned based on the source camera, stream label (e.g., front, side, diagonal, back, etc.), and/or camera group (e.g., forward-looking group, auxiliary group, etc.), assigned based on parameters of objects detected in the respective streams (e.g., wherein more processing resources are directed toward objects with a high potential collision score, high velocity, etc.), or otherwise determined. In one example, 50% of processing resources are allocated to the front-facing camera stream, 25% allocated to a first stream from a first set of side-facing cameras, and 25% allocated to a second stream from second set of front-facing cameras. In a second example, 50% of processing resources are allocated to the front-facing camera stream; 35% allocated to a first side stream, wherein a collision is detected in the first side stream (e.g., using object identification, tracking, and classification or regression); and 15% are allocated to a second stream from second set of front-facing cameras. In a second example, 40% of processing resources are allocated to the front-facing camera stream; 25% allocated to the first side stream; and 25% allocated to the second side stream, and 10% allocated to a rear stream (e.g., received from a camera opposing the front-facing camera across the system). However, the processing resources can be otherwise determined.

Determining a pixel depth for each pixel of one or more pixel subsets functions to create a depth map of the system surroundings. This is preferably performed by the vision processing system but can alternatively be performed by any other suitable processing system. Each pixel subset is preferably a subset of the pixels sampled by the selected camera subset (e.g., one pixel subset for each camera group, for each combination of two or more cameras in each camera group, for a subset of such combinations and/or camera groups, etc.), but can be a subset of pixels from any other suitable set of cameras. The pixel subset can be: the pixels within the overlapping regions of the camera subset (e.g., when the cameras cooperatively form a stereocamera), all or a portion of the pixels sampled by the camera subset (e.g., when the camera is a TOF or structured light system), or be any other suitable pixel subset.

All or some of the pixel subsets can additionally or alternatively be selected based on parameters associated with the system (and/or host robot) and/or the environment. A pixel subset associated with the forward-looking camera group can be selected based on the system traversal vector or kinematic parameters (e.g., velocity). For example, pixels associated with forward-facing subsets of the view regions can be selected (e.g., corresponding to a threshold distance and/or angular separation from the system traversal vector; corresponding to view regions in front of and/or close to in front of the system and/or host robot, such as view regions that can contain obstacles the system and/or host robot may collide with during traversal along the vector; etc.). In a specific example, a subset of the pixels captured by an upward-facing camera are selected (e.g., for the forward-looking group) based on their association with a forward-looking portion of the camera's view region (e.g., view region overlapping one or more other cameras of the forward-looking group, view region close to the system traversal vector, etc.). Additionally or alternatively, a pixel subset associated with the upward- and/or downward-looking camera group can be selected based on a system orientation, such as an orientation with respect to an external reference (e.g., gravity vector; vector normal a floor or ceiling plane, such as determined based on SLAM; etc.). For example, a subset of the pixels captured by an upward-facing camera are selected (e.g., for the upward-looking group) based on the gravity vector or other vertically-oriented vector (e.g., selecting pixels associated with regions directly above the system and/or host robot, such as a ceiling and/or other overhead obstacle, wherein a vertical axis parallel the gravity vector intersects both the obstacles and the system or host robot; selecting pixels associated with regions near the regions directly above the system and/or host robot; etc.), and/or a subset of the pixels captured by a downward-facing camera are selected (e.g., for the downward-looking group) analogously based on the gravity vector or other vertically-oriented vector. However, the pixel subsets can additionally or alternatively be selected in any other suitable manner.

Determining a pixel depth can include: sampling signals from the cameras, storing the sampled signals, and processing the stored samples to determine the pixel depth. However, the pixel depth can be otherwise determined.

Sampling signals from the cameras functions to capture images of the ambient environment. The images can be captured at a sampling frequency (e.g., predetermined; determined based on the system operation parameters, such as velocity or orientation; determined based on obstacles detected in the respective stream; etc.) or otherwise captured. The image from the entire camera active surface is preferably captured, but capturing the image can include capturing only a portion of the frame. Additionally or alternatively, sampling the signals can include simulating a stereocamera with a single camera, which can include: successively blacking out half the lens or active surface, then the other, between successive samples; changing capture modes between successive images; leveraging fact that robot is moving (e.g., using rate of change in detected object size or position to estimate object proximity, such as using pseudostereoscopic techniques); or otherwise simulating a stereocamera. Signals from all cameras are preferably sampled (e.g., at the same frequency or different frequencies). Alternatively, only signals from the camera subset are sampled. Signals from the cameras can be sampled substantially concurrently, sampled consecutively, sampled independently (e.g., without regard for sampling time of the other cameras), and/or sampled with any other suitable timing. However, signals from any other suitable set of cameras can be sampled.

Storing the sampled signals functions to store the images for subsequent processing. All sampled signals are preferably stored in the same memory (e.g., in the same buffer, in different buffers, etc.), but can alternatively be stored in different memory. The sampled signals are preferably stored for a predetermined period of time then discarded, but can alternatively be stored throughout the duration of the operation session, stored until a user offloads the signals, or stored for any other suitable period of time. In one example, signals from the camera subset are stored for longer periods of time than signals from other cameras of the plurality (e.g., back-facing cameras, etc.), wherein the latter can be immediately deleted, stored for a predetermined period of time (e.g., in case the system changes direction and they become the cameras of the camera subset), or stored for any other suitable period of time. Upon determination that the system traversal vector direction has changed, signals from the prior camera subset can be deleted immediately, stored for a predetermined period of time then deleted, or otherwise managed.

Processing the stored samples to determine the pixel depth functions to determine the distance of each ambient environment point represented by the pixel from the system (e.g., using computerized stereoscopic vision techniques, such as to determine a 3-dimensional point cloud corresponding to the ambient environment). The depth is preferably determined for each individual pixel, but can alternatively be determined for a plurality of pixels (e.g., average depth), or otherwise determined. The samples are preferably processed according to the determined processing parameters, but can be processed using a set of default processing parameters or otherwise processed. In a first variation, the pixel depth is determined using disparity analysis (e.g., wherein the pixel subset are pixels in the overlapping regions from a first and second camera of a stereocamera pair). In a second variation, the pixel depth is determined using time-of-flight analysis. In a third variation, pixel depth is determined based on incident pattern analysis (e.g., when the emitter emits structured light). In a first example, determining the depth includes: rectifying the images from each camera within the pair (e.g., using the respective epipolar lines), including remapping the image pair into a new image pair where the respective epipolar lines are horizontal and aligned with each other using the intrinsic and extrinsic parameters from the pair's calibration; applying stereomatching methods to the image pair for correspondence search, such as local stereo matching (block matching, gradient-based optimization, feature matching, etc.) and global stereo matching (dynamic programming, intrinsic curves method, graph cuts, nonlinear diffusion, belief propagation, correspondenceless methods, etc.); in response to identification of a unique match, associating the first image pixel (pixel from the first image) with the corresponding second image pixel; storing the association in a disparity map (describing the offset between pixels in the first image and pixels in the second image); and calculating the depth information for each pixel and its corresponding scene point in global coordinates based on the disparity map. However, pixel depth can be otherwise determined.

Processing the stored samples can additionally include pre-processing the samples. Pre-processing is preferably performed by the ISP, but can be performed by any other suitable system. Pre-processing the samples can include: color-balancing the images, sharpening the image, smoothing the image, cropping the image and/or selecting a pre-determined pixel subset (e.g., to the overlapped region shared with the other selected camera(s), to a predetermined size at a predetermined image location), stabilizing the image, stitching images from different cameras together (e.g., based on overlapping FOVs, based on a predetermined map, etc.), or otherwise pre-processing the image.

Dynamically controlling robot operation based on the determined pixel depth functions to automatically navigate the host robot based on the recorded images. This is preferably performed by the application processing system, but can additionally or alternatively be performed by a remote computing system (e.g., receiving the streamed signals), or by any other suitable system. The pixel depth and/or derivatory information (e.g., obstacle parameters) can additionally or alternatively be used to map the monitored region or used in any other suitable manner.

Dynamically controlling robot operation based on the determined pixel depth can include: identifying obstacles in the ambient environment from the sampled signals, determining obstacle parameters based on the sampled signals, and controlling the host robot based on the navigation instructions determined based on the obstacle parameters. However, robot operation can be otherwise controlled.

Identifying obstacles in the ambient environment from the sampled signals can include: identifying pixels with similar parameters and clustering the pixels together into an obstacle. The shared pixel parameter can be: pixel depth, foreground/background classification, contours, intensity, or any other suitable parameter. The pixels can be clustered using a k-means algorithm or otherwise clustered. However, the image can be segmented into obstacles using thresholding, compression-based methods, histogram-based methods, dual clustering methods, region-growing methods, partial differential-equation methods, variational methods, graph partitioning methods, watershed transformations, model-based segmentation, multi-scale segmentation, and/or any other suitable object detection method.

Identifying obstacles can additionally or alternatively include applying object recognition methods to the identified obstacle. Object recognition methods can include appearance-based methods (e.g., edge matching, divide-and-conquer searching, greyscale matching, gradient matching, histograms of receptive field responses, large modelbases, etc.), feature-based methods (e.g., interpretation trees, hypotheses, pose consistency, pose clustering, invariance, geometric hashing, scale-invariant feature transform, speeded up robust features, etc.), genetic algorithms, or any other suitable method.

Determining obstacle parameters based on the sampled signals functions to characterize the obstacle. Obstacle parameters can include: obstacle distance from the system and/or host robot (e.g., obstacle clearance), obstacle position relative to the system, obstacle size, shape, velocity, travel direction, numerosity, or any other suitable parameter. The obstacle parameters can be determined from a single set of images (e.g., recorded at a single timestamp and/or at temporally nearby times), a sequence of images, or any suitable set of images. For example, the obstacle distance can be determined from the pixel depth of the cluster of pixels cooperatively representing the obstacle (e.g., minimum pixel depth, average pixel depth, etc.).

Figure 12B:
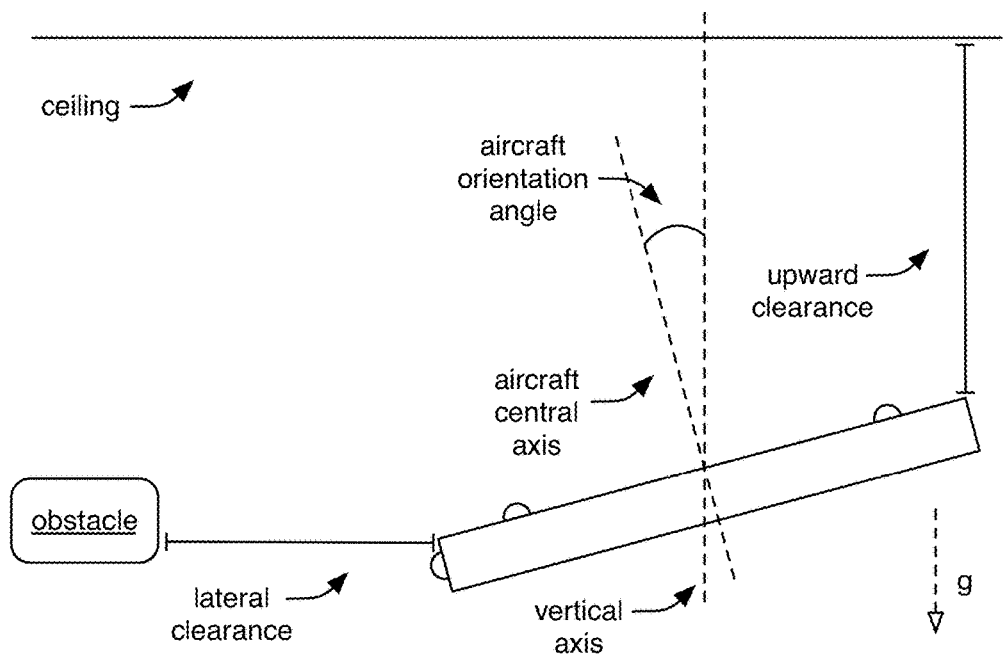

In one variation, determining obstacle parameters can include determining one or more lateral clearances (e.g., forward clearance, backward clearance, side clearance, etc.) and/or one or more vertical (or otherwise non-lateral) clearances (e.g., upward clearance, downward clearance, etc.). For example, determining obstacle parameters can include determining a forward clearance based on the pixel subset associated with the forward-looking camera group and determining an upward clearance (e.g., ceiling clearance) based on the pixel subset associated with the upward-looking camera group, and can additionally or alternatively include determining a downward clearance (e.g., ground clearance) based on the pixel subset associated with the downward-looking camera group, a rear clearance based on the pixel subset associated with the backward-looking camera group, and/or any other suitable clearances (e.g., as shown in FIG. 12B). In a specific example, the forward clearance is a distance between the system and a first obstacle, wherein the first obstacle is preferably within the view region of two or more of the cameras of the forward-looking group (e.g., both front-facing cameras, a front-facing camera and an upward-facing fisheye camera, etc.), and the upward clearance is a distance between the system and a second obstacle, wherein the second obstacle is preferably within the view region of two or more of the cameras of the upward-looking group, more preferably including at least one camera also included in the forward-looking group. However, the method can additionally or alternatively include determining any suitable obstacle parameters in any suitable manner.

Controlling the host robot based on the navigation instructions determined based on the obstacle parameters functions to automatically control the host robot. The navigation instructions are preferably determined and applied by the application processing system, but can be determined and/or applied by the robot processing system or by any other suitable system. The robot is preferably controlled using closed-loop control, but can alternatively be controlled using open-loop control or otherwise controlled. The robot is preferably controlled to avoid collision with the detected obstacle(s), but can additionally or alternatively be controlled to collide with the detected obstacles or otherwise interact with the detected obstacles. The navigation instructions can be determined using SLAM (e.g., using an extended Kalman filter, no Kalman filter, etc.), RRT, motion planning (e.g., grid-based search, interval-based search, geometric algorithms, reward-based algorithms, artificial potential fields, sampling-based algorithms, probabilistic roadmap, etc.), or using any other suitable method. The navigation instructions can be dynamically generated, selected (e.g., from a library), or otherwise determined based on the obstacle parameters. Examples of navigation instructions include: changing altitude, changing speed (e.g., braking, speeding up), traversing along a determined route (e.g., escape route), or include any other suitable set of navigation instructions.

The navigation instruction and/or parameters thereof can be determined based on robot operation parameters (e.g., speed, context, location, etc.), obstacle parameters (e.g., class, speed, distance, etc.), or based on any other suitable information. For example, a braking instruction can be selected when the obstacle is a human and the human-robot separation distance is greater than a robot braking distance given the robot speed, while an avoidance instruction can be selected when the obstacle is a pole and/or the obstacle-robot separation distance is smaller than a robot braking distance given the robot speed. In one example, the robot changes its velocity, such as by entering a hovering mode (e.g., substantially maintaining a fixed position in the air), in response to detecting a potential collision with an obstacle in front of it (e.g., along its traversal vector) and/or detecting that a clearance (e.g., forward clearance) to the obstacle is less than a target or minimum clearance threshold (e.g., predefined threshold; dynamically-determined threshold, such as determined based on the system and/or obstacle velocity; etc.). In another example, the robot uses the upward and/or downward clearance (e.g., ceiling and/or floor clearance) to substantially maintain a set distance from the ceiling and/or floor, and/or to maintain a minimum distance from the ceiling and/or floor.

The navigation instructions and/or parameters thereof can additionally or alternatively be determined based on the obstacle parameters and the robot operation mode. For example, in response to detection of a hand, a slow collision instruction can be determined when the robot is in a "return" mode (such that the robot traverses toward the hand), and an avoidance or braking instruction can be determined when the robot is in a different mode (e.g., a "fly" or "record" mode). However, the navigation instructions can be otherwise determined.

Embodiments of the system and/or method can include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for aircraft operation comprising, at an aircraft comprising a set of cameras:
    selecting a first camera group from the set of cameras, the first camera group comprising a lateral camera and a first downward-facing camera, wherein a lateral camera view region and a first downward-facing camera view region each comprise a first overlapped subset;
    selecting a second camera group from the set of cameras, the second camera group comprising the first downward-facing camera and a second downward-facing camera, wherein the first downward-facing camera view region and a second downward-facing camera view region each comprise a second overlapped subset;
    sampling a set of images, comprising:
        at the first downward-facing camera, sampling a first image during a first time period;
        at the second downward-facing camera, sampling a second image during the first time period; and
        at the lateral camera, sampling a third image during the first time period;
    based on the first camera group, determining a first dataset associated with a first region of the first image and a region of the third image, wherein the first region of the first image and the region of the third image are each representative of a first obstacle within the first overlapped subset;
    based on the first dataset, determining a lateral clearance between the aircraft and the first obstacle;
    based on the second camera group, determining a second dataset associated with a second region of the first image and a region of the second image, wherein the second region of the first image and the region of the second image are each representative of a second obstacle within the second overlapped subset;
    based on the second dataset, determining an downward clearance between the aircraft and the second obstacle; and
    based on the lateral clearance and the downward clearance, controlling flight of the aircraft.

2. The method of claim 1, wherein the aircraft defines a lateral plane, the aircraft further comprising:
    a set of rotors comprising a first rotor, a second rotor, a third rotor, and a fourth rotor, each rotor of the set defining a respective rotor rotation axis and a respective rotor plane normal the respective rotor rotation axis, wherein each respective rotor plane is coplanar with the lateral plane; and
    a housing defining a perimeter, the perimeter surrounding the set of rotors within the lateral plane.

3. The method of claim 2, wherein:
    the housing comprises a central portion arranged between the first and second rotors; and
    the first and second downward-facing cameras are mounted to the central portion.

4. The method of claim 3, wherein the lateral camera is arranged on the perimeter.

5. The method of claim 1, further comprising, based on the lateral clearance and an aircraft velocity, determining a potential collision with the first obstacle, wherein controlling flight of the aircraft comprises changing the aircraft velocity to avoid the potential collision.

6. The method of claim 1, wherein selecting the first camera group comprises selecting the lateral camera based on an aircraft velocity vector, wherein a lateral camera view vector within the lateral camera view region is parallel the aircraft velocity vector.

7. The method of claim 6, further comprising, after the first time period:
    controlling the aircraft to change velocity to a second aircraft velocity vector non-parallel the aircraft velocity vector;
    selecting a third camera group from the set of cameras based on the second aircraft velocity vector, the third camera group comprising a second lateral camera and the second downward-facing camera, wherein a second lateral camera view region and the second downward-facing camera view region each comprise a third overlapped subset;
    sampling a second set of images, comprising:
        at the second downward-facing camera, sampling a fourth image during a second time period; and
        at the second lateral camera, sampling a fifth image during the second time period;
    based on the third camera group, selecting a third dataset comprising a region of the fourth image and a region of the fifth image, wherein the region of the fourth image and the region of the fifth image are each representative of a third obstacle within the third overlapped subset;
    based on the third dataset, determining a second lateral clearance between the aircraft and the third obstacle; and
    based on the second lateral clearance, controlling flight of the aircraft.

8. The aircraft of claim 1, wherein the first image, the second image, and the third image are sampled at a first time.

9. A method for aircraft operation comprising, at an aircraft comprising a first camera, a second camera, and a third camera:
- sampling a set of images, comprising:
  - at the first camera, sampling a first image;
  - concurrent with sampling the first image, at the second camera, sampling a second image, wherein a first camera view region and a second camera view region both comprise a first overlapped subset; and
  - concurrent with sampling the first image, at the third camera, sampling a third image, wherein a third camera view region and the second camera view region both comprise a second overlapped subset;
- determining a first dataset associated with a region of the first image and a first region of the second image, wherein the region of the first image and the first region of the second image are both representative of a first obstacle within the first overlapped subset;
- based on the first dataset, determining a first obstacle clearance between the aircraft and the first obstacle;
- determining a second dataset associated with a second region of the second image and a region of the third image, wherein the region of the third image and the second region of the second image are both representative of a second obstacle within the second overlapped subset and outside the first overlapped subset;
- based on the second dataset, determining a second obstacle clearance between the aircraft and the second obstacle; and
- based on the first obstacle clearance and the second obstacle clearance, controlling flight of the aircraft.

10. The method of claim 9, wherein the aircraft defines a lateral plane, the aircraft further comprising:
- a set of rotors comprising a first rotor, a second rotor, a third rotor, and a fourth rotor, each rotor of the set defining a respective rotor rotation axis and a respective rotor plane normal the respective rotor rotation axis, wherein each respective rotor plane is coplanar with the lateral plane; and
- a housing defining a perimeter, the perimeter surrounding the set of rotors within the lateral plane.

11. The method of claim 10, wherein the first and second cameras are arranged on the perimeter.

12. The method of claim 11, wherein:
- the aircraft defines a central axis normal to the lateral plane, wherein the central axis is arranged within a convex hull of the rotor rotation axes of the set of rotors;
- the perimeter comprises:
  - a first side arranged proximal the first and second rotors with respect to the central axis; and
  - a second side arranged proximal the third rotor and distal the first rotor with respect to the central axis;
- the first and second cameras are arranged along the first side; and
- the third camera is arranged along the second side.

13. The method of claim 12, wherein the second side is arranged proximal the fourth rotor with respect to the central axis.

14. The method of claim 11, wherein:
- the housing comprises a central portion arranged between the first and second rotors; and
- the third camera is mounted to the central portion.

15. The method of claim 9, wherein:
- a first angle between a first camera central view axis and a second camera central view axis is greater than a threshold angle; and
- a second angle between a second camera central view axis and the third camera central view axis is greater than the threshold angle.

16. The method of claim 15, wherein the threshold angle is 60 degrees.

17. The method of claim 9, wherein:
- the third camera view region further comprises the first overlapped subset; and
- the first dataset further comprises a second region of the third image, the second region of the third image representative of the first obstacle.

18. The method of claim 9, wherein a first camera view vector within the first camera view region is parallel an aircraft velocity vector and a second camera view vector within the second camera view region is parallel the aircraft velocity vector.

19. An aircraft comprising:
- a housing;
- a set of cameras mechanically coupled to the housing, the set of cameras comprising a first camera, a second camera, and a third camera;
- a motive mechanism mechanically coupled to the housing; and
- a processor mechanically coupled to the housing;

wherein the processor is configured to:
- receive a set of images from the set of cameras, the set of images comprising:
  - a first image sampled by the first camera, the first image representative of a first obstacle;
  - a second image sampled by the second camera, the second image representative of the first obstacle and a second obstacle; and
  - a third image sampled by the third camera, the third image representative of the second obstacle;
- based on the first and second images, determine a first obstacle clearance between the aircraft and the first obstacle;
- based on the third image, determine a second obstacle clearance between the aircraft and the second obstacle; and
- based on the first obstacle clearance and the second obstacle clearance, control operation of the motive mechanism to control flight of the aircraft.

20. The aircraft of claim 19, wherein:
- the aircraft defines a lateral plane;
- the aircraft further comprises a set of rotors comprising a first rotor, a second rotor, a third rotor, and a fourth rotor, each rotor of the set defining a respective rotor rotation axis and a respective rotor plane normal the respective rotor rotation axis, wherein each respective rotor plane is coplanar with the lateral plane;
- the housing defines a perimeter, the perimeter surrounding the set of rotors within the lateral plane;
- the perimeter defines a first side arranged proximal the first and second rotors; and
- the first and second cameras are arranged along the first side.

21. The aircraft of claim 19, wherein:
- the housing comprises a central portion arranged between the first and second rotors; and
- the second and third cameras are mounted to the central portion.

* * * * *